(12) United States Patent
Huang

(10) Patent No.: US 11,116,311 B2
(45) Date of Patent: Sep. 14, 2021

(54) TELESCOPIC TUBE ASSEMBLY FOR HEIGHT ADJUSTABLE TABLE

(71) Applicant: Chia-Yen Huang, Taichung (TW)

(72) Inventor: Chia-Yen Huang, Taichung (TW)

( * ) Notice: Subject to any disclaimer, the term of this patent is extended or adjusted under 35 U.S.C. 154(b) by 415 days.

(21) Appl. No.: 16/197,393

(22) Filed: Nov. 21, 2018

(65) Prior Publication Data

US 2020/0128949 A1      Apr. 30, 2020

(30) Foreign Application Priority Data

Oct. 26, 2018   (TW) .................................. 107214620

(51) Int. Cl.
*A47B 9/04* (2006.01)
*A47B 9/20* (2006.01)
*F16B 7/14* (2006.01)

(52) U.S. Cl.
CPC .................. *A47B 9/04* (2013.01); *A47B 9/20* (2013.01); *F16B 7/14* (2013.01); *A47B 2009/046* (2013.01); *A47B 2200/0052* (2013.01)

(58) Field of Classification Search
CPC ..... A47B 9/04; A47B 9/20; A47B 2200/0052; A47B 2200/0053; A47B 2200/0054
See application file for complete search history.

(56) References Cited

U.S. PATENT DOCUMENTS

| 2006/0279143 | A1* | 12/2006 | Platz | A47B 9/04 310/51 |
| 2010/0252697 | A1* | 10/2010 | Koenig | B66F 7/10 248/161 |
| 2014/0360415 | A1 | 12/2014 | Riis et al. | |
| 2015/0330486 | A1* | 11/2015 | Hu | F16H 25/12 74/89.14 |
| 2016/0281912 | A1* | 9/2016 | Christen | A47C 3/40 |
| 2018/0172062 | A1* | 6/2018 | Hu | H02K 5/24 |
| 2019/0357668 | A1* | 11/2019 | Knudtson | A47B 9/20 |

FOREIGN PATENT DOCUMENTS

| KR | 20130049655 A | * | 5/2013 |
| KR | 20180075768 A | * | 7/2018 |

* cited by examiner

*Primary Examiner* — Joshua T Kennedy

(57) ABSTRACT

A telescopic tube assembly includes an outer tube and an inner tube which is telescopically inserted in the outer tube. A first stabilizing unit and a second stabilizing unit respectively located in a gap between the inner and outer tubes to make the inner tube stably moved relative to the outer tube. The first stabilizing unit includes two plates. The outer surface of each of the two plates is in contact with the inner surface of the outer tube, and the inner surface of each of the two plates is in contact with the outer surface of the inner tube. The inner tube is assembled to the outer tube by the first and second stabilizing units.

8 Claims, 8 Drawing Sheets

TELESCOPIC TUBE ASSEMBLY FOR HEIGHT ADJUSTABLE TABLE

BACKGROUND OF THE INVENTION

1. Fields of the Invention

The present invention relates to a telescopic tube assembly, and more particularly, to a telescopic tube assembly for a height adjustable table.

2. Descriptions of Related Art

A conventional lifting column for height adjustable table known to Applicant is disclosed in U.S. Publication Number 20140360415 and CN104066356, and comprises a guide and a drive unit. The guide comprises at least a first member and a second member, where the members are mutually telescopically arranged relative to each other and where a first set of sliders is arranged on an internal side of the first member at the end of the first member into which the second member extends and may be displaced out of. A second and third set of sliders are arranged on the outside of the second member at the end of the second member which extends into the first member. The second set of sliders describes a first plane has been applied a given first prestressing between the first member and the second member. The third set of sliders describes a second plane, which is different from the first plane, has been applied a given second prestressing between the first member and the second member. The second applied prestressing is smaller than the first applied prestressing.

However, it takes a lot of time to install the sliders between the first and second members. The sliders have to be precisely positioned at desired positions and this also requires skilled persons and time to finish the installation. Once these sliders are set between the first and second members, no extra part can be added. In other words, when any of the above mentioned parts are damaged or needs to be replaced, the first and second members have to be separated completely which is inconvenient for the assemblers. Although some manufacturers provide a single piece slider, however, the single piece slider is difficult to be installed.

The present invention is intended to provide a telescopic tube assembly that is designed to eliminate the drawbacks mentioned above.

SUMMARY OF THE INVENTION

The present invention relates to a telescopic tube assembly and comprises an outer tube and an inner tube which is telescopically inserted in the outer tube. A first stabilizing unit and a second stabilizing unit respectively located in a gap between the inner and outer tubes to make the inner tube stably moved relative to the outer tube. The first stabilizing unit includes two plates. The outer surface of each of the two plates is in contact with the inner surface of the outer tube, and the inner surface of each of the two plates is in contact with the outer surface of the inner tube. The second stabilizing unit comprises multiple end pieces which are fixed to the outer surface of the second end of the inner tube. Each end piece includes at least one groove facing the inner surface of the outer tube. The at least one groove is filled with lubricant. The inner tube is easily assembled to the outer tube by the first and second stabilizing units.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
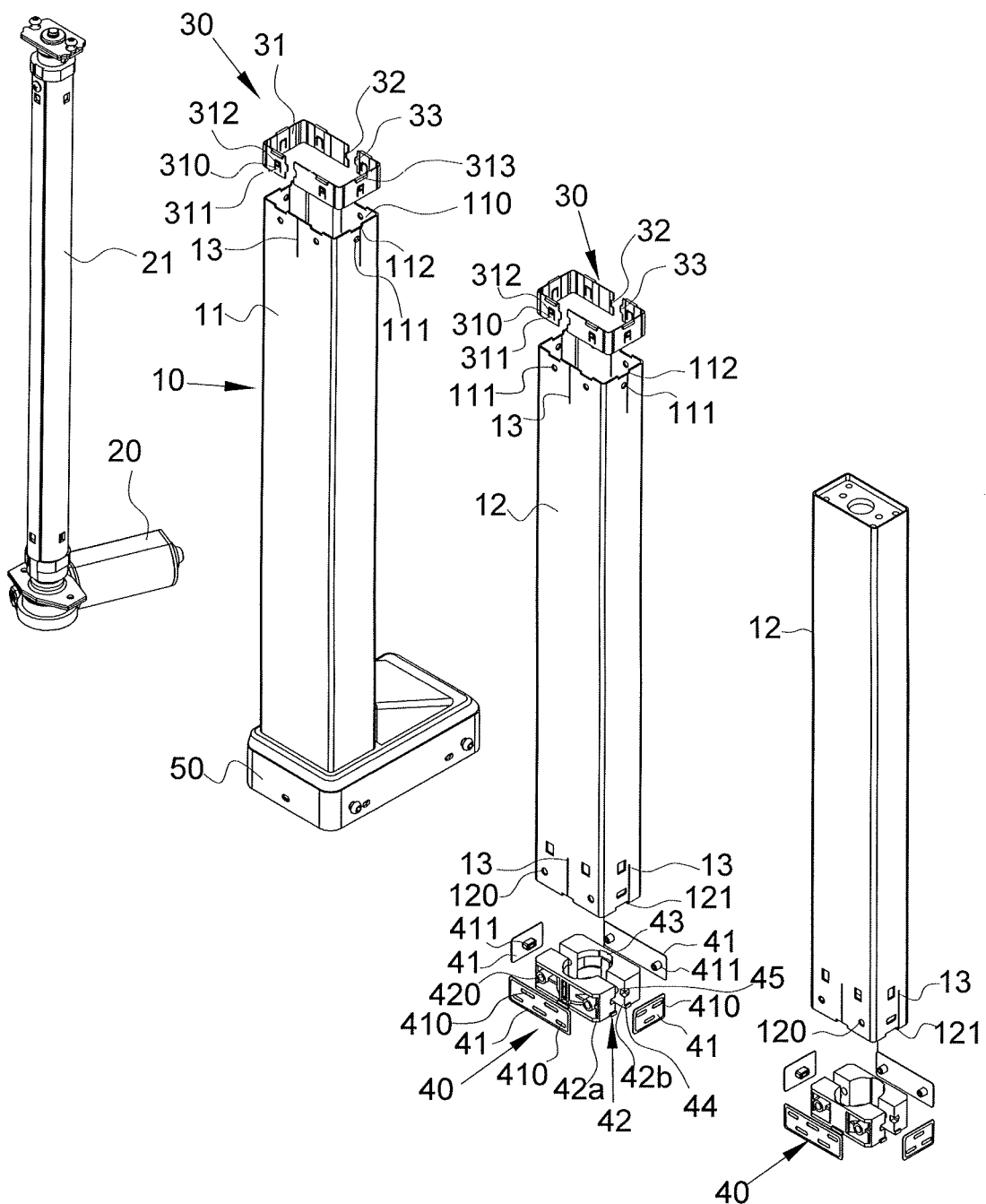
FIG. 1 is an exploded view of the telescopic tube assembly of the present invention.

Referring to FIGS. 1 to 10, the telescopic tube assembly 10 of the present invention comprises an outer tube 11 and an inner tube 12, wherein the outer tube 11 includes a first end and a second end. A first stabilizing unit 30 is engaged with the inner surface of the first end of the outer tube 11. The inner tube 12 includes a first end and a second end, wherein a second stabilizing unit 40 is engaged with the outer surface of the second end of the inner tube 12. The second end of the inner tube 12 is inserted into the first opening 110 of the first end of the outer tube 11. The first and second stabilizing units 30, 40 located within a gap "D" between the outer tube 11 and the inner tube 12. The inner tube 12 is driven aby a driving unit 20 to be movable relative to the outer tube 11.

The first stabilizing unit 30 includes two plates 31, and each plate 31 is a U-shaped plate and includes a first end portion 32 and a second end portion 33 respectively formed on two ends thereof. The axial length is three times of the width of the each plate 31. The first end portion 32 and the second end portion 33 of one of the two plates 31 are connected to the second end portion 33 and the first end portion 32 of the other one of the two plates 31. The outer surface of each of the two plates 31 is in contact with the inner surface of the first end of the outer tube 11. The inner surface of each of the two plates 31 is in contact with the outer surface of the inner tube 12.

In one embodiment, the outer tube 11 or the inner tube 12 includes multiple slits 13 at the position where the first and second stabilizing units 30, 40 are installed. The slits 13 extend along the axis of the inner tube 12 and the outer tube 11 so as to provide proper flexibility such that the inner tube 12 is smoothly moved relative to the outer tube 11.

Figure 9:
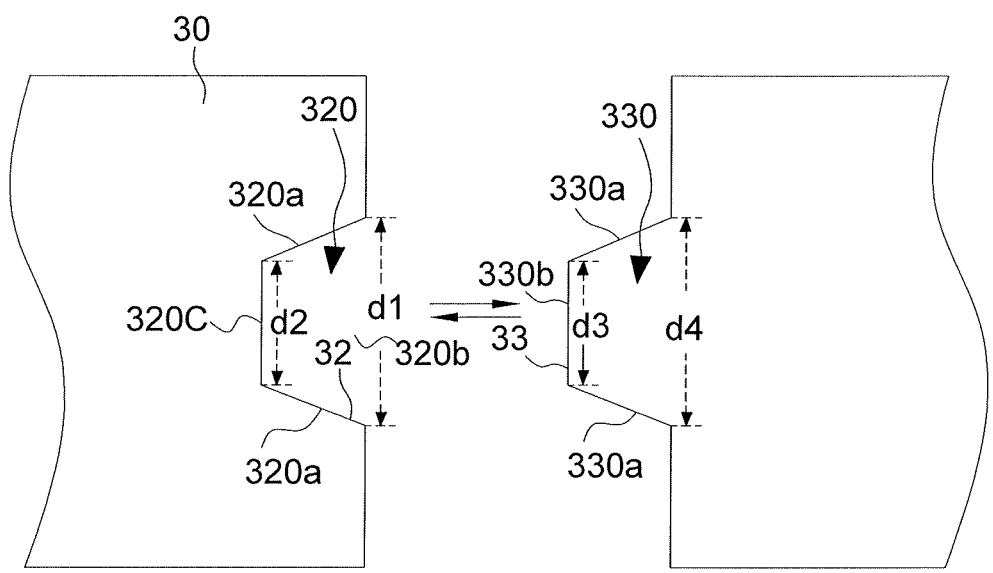
FIG. 9 shows the first end portion and the second end portion of the first stabilizing unit.
Figure 10:
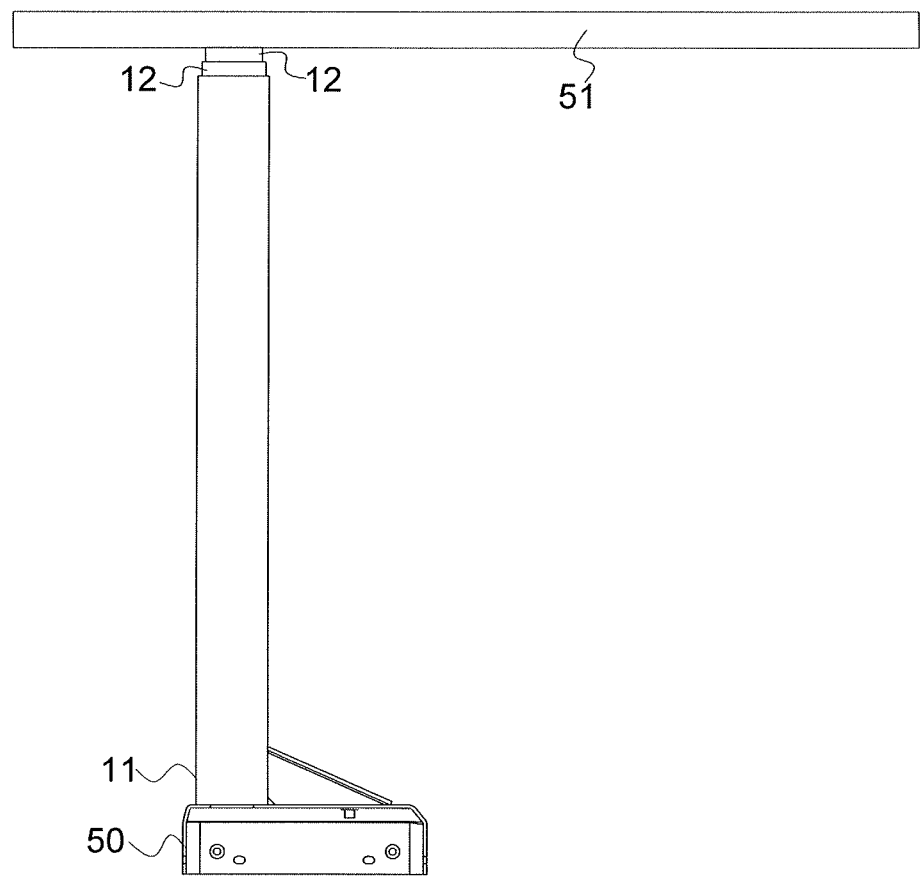
FIG. 10 shows that the telescopic tube assembly of the present invention is connected between the base and a table top.

As shown in FIGS. 1 and 9, the first end portion 32 is a recess 320 and the second end portion 33 is a tongue 330. The tongue 330 is engaged with the recess 320 when the two plates 31 are connected to form a loop or a ring.

As shown in FIG. 9, the recess 320 includes two first sides 320a and an inner bottom 320c formed between the two first sides 320a. A second opening 320b is defined between the two first sides 320a and the inner bottom 320c. A first distance "d1" is formed between two distal ends of the two first sides 320a. The width of the inner bottom 320c is defined as a second distance "d2" which is shorter than the first distance "d1" so as to define the second opening 320b as a divergent opening. The tongue 330 includes two second sides 330a and a top end 330b formed between the two second sides 330a. The width of the top end 330b is defined as a third distance "d3". A fourth distance "d4" is formed between two roots of the two second sides 330a. The third distance "d3" is shorter than the fourth distance "d4" so as to define the tongue 330 as a convergent tongue as disclosed in FIG. 8. The first sides 320a are matched with the second sides 330a, and the inner bottom 320c is matched with the top end 330b when the tongue 330 is engaged with the recess 320 when the two plates 31 are connected to each other as described.

Figure 2:
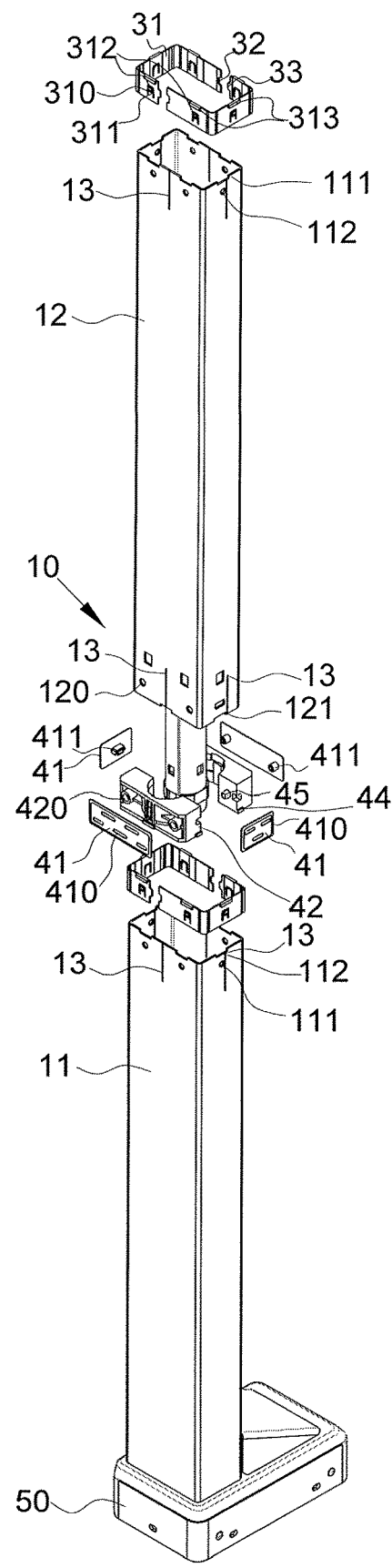
FIG. 2 shows the inner tube and the outer tube of the telescopic tube assembly of the present invention.
Figure 3:
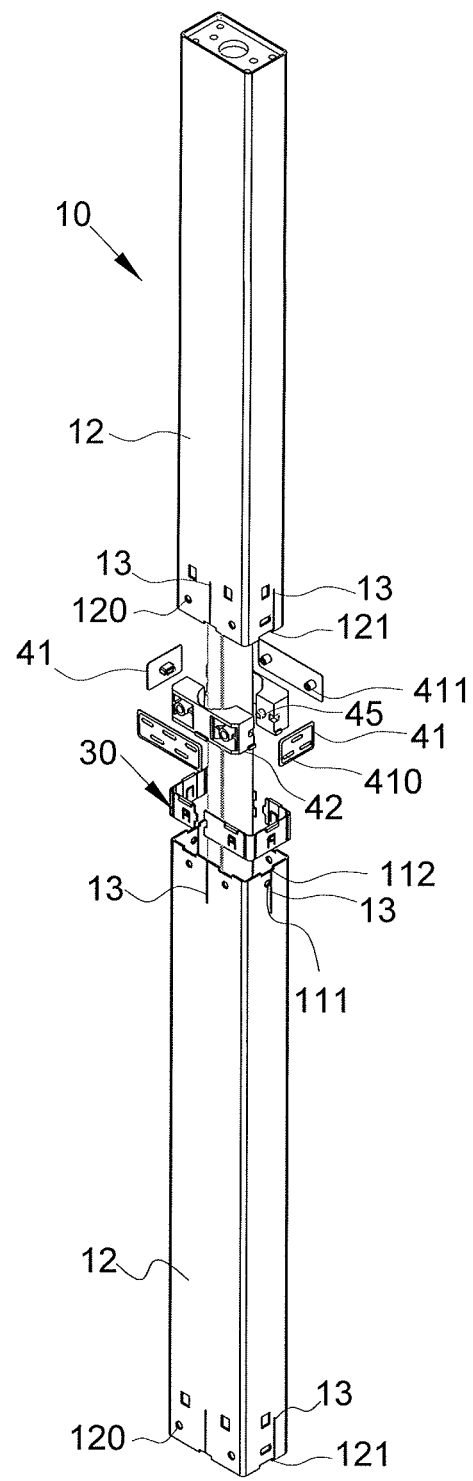
FIG. 3 is another view to show the inner tube and the outer tube of the telescopic tube assembly of the present invention.

As shown in FIGS. 1 and 2, each of the two plates 31 includes a U-shaped inner bottom which is formed between a long side arm and a short side arm. The long side arm and the short side arm of one of the two plates 31 are respectively connected to the short side arm and the long side arm of the other one of the two plates 31.

Figure 5:
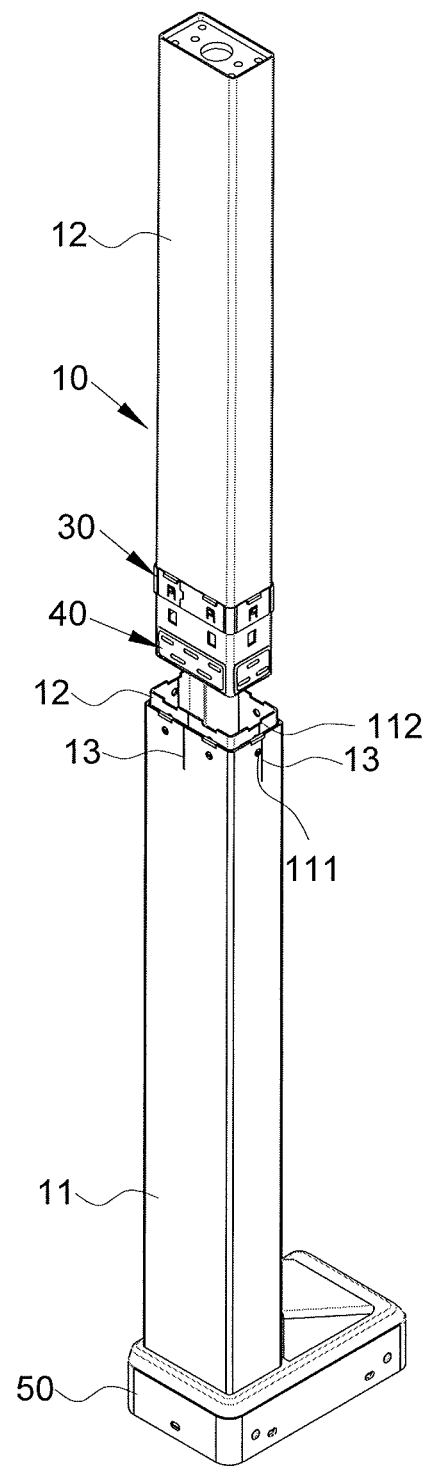
FIG. 5 shows the second stabilizing unit is installed to the second end of the inner tube of the present invention.
Figure 6:
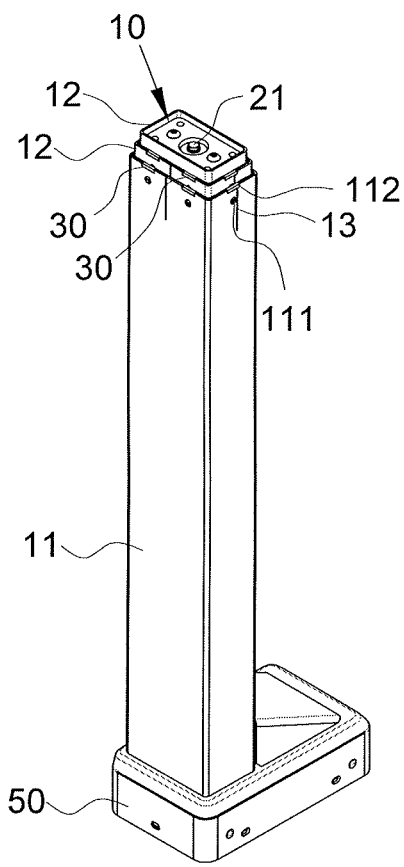
FIG. 6 shows the telescopic tube assembly of the present invention is connected on a base.
Figure 8:
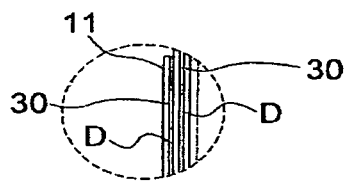
FIG. 8 is taken along the circle A in FIG. 7 to show the enlarged view of the cross section.
Figure 7:
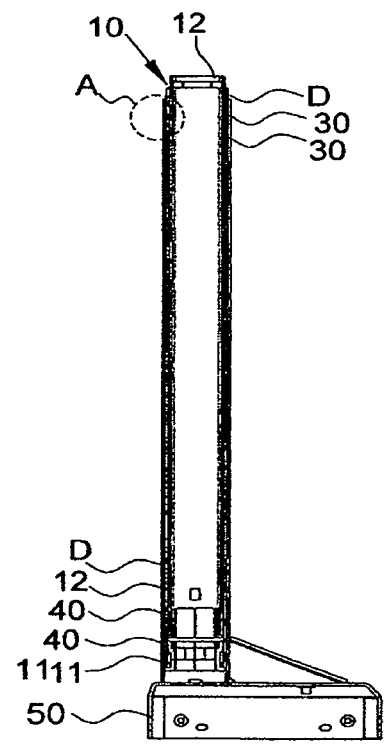
FIG. 7 is a cross sectional view of the disclosure of FIG. 6.

As shown in FIGS. 5 and 6, each of the two plate 31 includes at least one through hole 310. A split 311 extends inward from the inner periphery of the at least one through hole 310. A protrusion 312 extends from each of the two plates 31 and is located beside the split 311. The outer tube 11 has multiple engaging holes 111 through which the protrusions 312 extend. Each of the plates 31 has multiple engaging portions 313 extending from the top edge thereof. The outer tube 11 has multiple notches 112 defined the first end thereof. The engaging portions 313 are engaged with the notches 112.

As shown in FIGS. 1-7, the second stabilizing unit 40 comprises four end pieces 41 which are fixed to the outer surface of the second end of the inner tube 12. Each end piece 41 includes at least one groove 410 facing the inner surface of the outer tube 11. The at least one groove 410 is filled with lubricant to reduce friction between the end pieces 41 and the outer tube 11.

As shown in FIGS. 1 and 2, the at least one groove 410 includes multiple grooves. An angle of 90 degrees is formed between the axis of the inner tube 12 and the axis of each of the grooves 410. Specifically, the grooves 410 are arranged into a first row of the grooves and a second row of the grooves. The first row of the grooves includes two grooves 410 with a blank area located between the two grooves 410. The second row of the grooves includes three grooves 410, and the second groove 410 of the three grooves 410 of the second row of the grooves 410 is located below the blank area of the first row of the grooves 410.

As shown In FIGS. 1-5, the second end of the inner tube 12 includes at least one aperture 120 defined in each of four sides thereof. The second stabilizing unit 40 further includes a positioning part 42 which has a passage 43 defined therethrough so that the telescopic unit 21 of the driving unit 20 extends. The positioning part 42 includes at least one guide hole 420 in each of four sides thereof, and the at least one guide hole 420 is located corresponding to the aperture 120 corresponding thereto. The four end pieces 41 each have at least one rod 411 that extends through the at least one aperture 120 and is engaged with the at least one guide hole 420. The positioning part 42 includes a block 44 extending from the underside of each side. The second end of the inner tube 12 includes a notch 121 in each of four sides thereof, the blocks 44 are engaged with the notches 121 of the second end of the inner tube 12. Therefore, the second stabilizing unit 40 is positioned to the outer surface of the second end of the inner tube 12.

Specifically, the positioning part 42 includes a first member 42a, a second member 42b and an engaging device 45 that is located between the first and second members 42a, 42b and connects the first and second members 42a, 42b to form the positioning part 42. The guide hole 420 in each of the two short sides thereof is formed by the recessed portion of each of the first and second members 42a, 42b. The block 44 in each of the two short sides thereof is formed by a protruded portion of each of the first and second members 42a, 42b.

Figure 4:
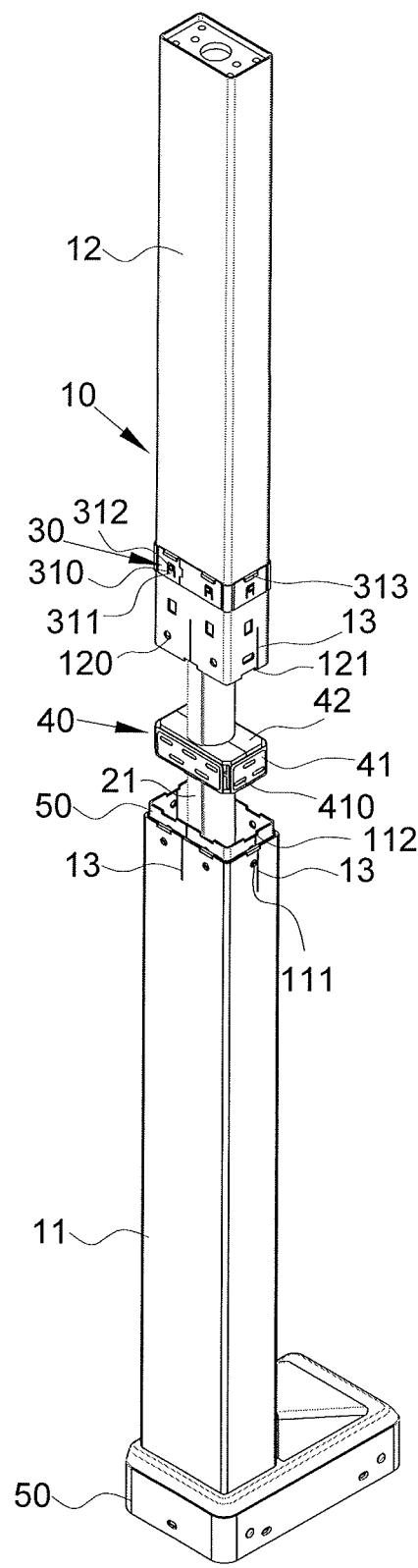
FIG. 4 shows the second stabilizing unit is to be installed to the second end of the inner tube of the present invention.

As shown in FIGS. 4 to 6, the telescopic unit 21 and the driving unit 20 are installed to the base 50. The second end of the outer tube 11 is fixed to the base 50. The telescopic unit 21 extends through the first opening 110. The first stabilizing unit 30 is first mounted to the inner tube 12. The positioning part 42 is located in the inner tube 12, and the telescopic unit 21 extends through the passage 43. The end pieces 41 are connected to the outer surface of the inner tube 12. The rods 411 extend through the apertures 120 of the inner tube 12 and are engaged with the guide holes 420 of the positioning part 42, so that the second stabilizing unit 40 is connected to the outer surface of the second end of the inner tube 12. The inner tube 12 with the second stabilizing unit 40 are inserted into the second end of the outer tube 11, and the first stabilizing unit 30 is moved to the outer tube 11. The protrusions 312 of the splits 311 are engaged with the engaging holes 111. The engaging portions 313 are engaged with the notches 112 of the outer tube 11 to position the first stabilizing unit 30 to the inner surface of the first end of the outer tube 11.

As shown in FIGS. 4 to 6 and 10, the upper portion of the inner tube 12 is fixed to the telescopic unit 21. When the driving unit 20 drives the inner tube 12 upward relative to the outer tube 11 via the telescopic unit 21, the table top 51 connected to the inner tube 12 is raised. The table top 51 connected to the inner tube 12 is lowered when the driving unit 20 drives the inner tube 12 downward relative to the outer tube 11 via the telescopic unit 21.

While we have shown and described the embodiment in accordance with the present invention, it should be clear to those skilled in the art that further embodiments may be made without departing from the scope of the present invention.

What is claimed is:

1. A telescopic tube assembly comprising:
   an outer tube having a first end and a second end, a first stabilizing unit engaged with an inner surface of the first end of the outer tube;
   an inner tube having a first end and a second end, a second stabilizing unit engaged with an outer surface of the second end of the inner tube, the second end of the inner tube inserted into a first opening of the first end of the outer tube, the first and second stabilizing units located within a gap between the outer tube and the inner tube, and
   the first stabilizing unit having two plates, each plate being a U-shaped plate and including a first end portion and a second end portion respectively formed on two ends thereof, the first end portion and the second end portion of one of the two plates being connected to the second end portion and the first end portion of the other one of the two plates, an outer surface of each of the two plates being in contact with the inner surface of the first end of the outer tube, an inner surface of each of the two plates being in contact with the outer surface of the inner tube; wherein the first end portion being a recess and the second end portion being a tongue, the tongue being engaged with the recess when the two plates are connected to form a loop; wherein the recess including two first sides and an inner bottom formed between the two first sides, a second opening being defined between the two first sides and the inner bottom, a first distance being formed between two distal ends of the two first sides, a width of the inner bottom being defined as a second distance which is shorter than the first distance so as to define the second opening as a divergent opening, the tongue including two second sides and a top end formed between the two second sides, a width of the top end being defined as a third distance, a fourth distance being formed between two roots of the two second sides, the third distance being shorter than the fourth distance so as to define the tongue as a convergent tongue.

2. The telescopic tube assembly as claimed in claim 1, wherein the first sides are matched with the second sides, and the inner bottom is matched with the top end when the tongue is engaged with the recess.

3. The telescopic tube assembly as claimed in claim 1, wherein each of the two plates includes a U-shaped inner bottom which is formed between a long side arm and a short side arm, the long side arm and the short side arm of one of the two plates are respectively connected to the short side arm and the long side arm of the other one of the two plates.

4. The telescopic tube assembly as claimed in claim 1, wherein each of the two plate includes at least one through hole, a split extends inward from an inner periphery of the at least one through hole, a protrusion extends from each of the two plates and is located beside the split, the outer tube has multiple engaging holes through which the protrusions extend.

5. The telescopic tube assembly as claimed in claim 4, wherein each of the plates has multiple engaging portions extending from a top edge thereof, the outer tube has multiple notches defined the first end thereof, the engaging portions are engaged with the notches.

6. The telescopic tube assembly as claimed in claim 1, wherein the second stabilizing unit comprises multiple end pieces which are fixed to the outer surface of the second end of the inner tube, each end piece includes at least one groove facing the inner surface of the outer tube, the at least one groove is filled with lubricant.

7. The telescopic tube assembly as claimed in claim 6, wherein the at least one groove includes multiple grooves.

8. The telescopic tube assembly as claimed in claim 7, wherein an angle is formed between an axis of the inner tube and an axis of each of the grooves, the grooves are arranged into a first row of the grooves and a second row of the grooves, the first row of the grooves includes two grooves with a blank area located between the two grooves, the second row of the grooves includes three grooves, a second groove of three grooves of the second row of the grooves is located below the blank area of the first row of the grooves.

* * * * *